March 30, 1971 O. R. VIDEEN Re. 27,109

METHOD [AND APPARATUS] FOR PRODUCING SPECIAL SURFACES ON PANEL BOARD

Original Filed Jan. 4, 1965

Inventor
Otis R. Videen by W. Bartlett Jones,
Attorney

United States Patent Office

Re. 27,109
Reissued Mar. 30, 1971

27,109

METHOD [AND APPARATUS] FOR PRODUCING SPECIAL SURFACES ON PANEL BOARD

Otis R. Videen, St. Paul, Minn., assignor to Conwed Corporation

Original No. 3,391,013, dated July 2, 1968, Ser. No. 423,168, Jan. 4, 1965. Application for reissue Feb. 6, 1969, Ser. No. 822,081
Int. Cl. B28b *5/00;* B44d *1/02, 5/02*
U.S. Cl. 117—10 2 Claims

Matter enclosed in heavy brackets [ ] appears in the original patent but forms no part of this reissue specification; matter printed in italics indicates the additions made by reissue.

ABSTRACT OF THE DISCLOSURE

In the production of an acoustical product having plural layers and an irregular top surface, the surface layer is simultaneously doctored onto a lower carrying layer and provided with an irregular top surface by a rotating roll arranged at an angle to the movement of the carrier material.

Figure 1:
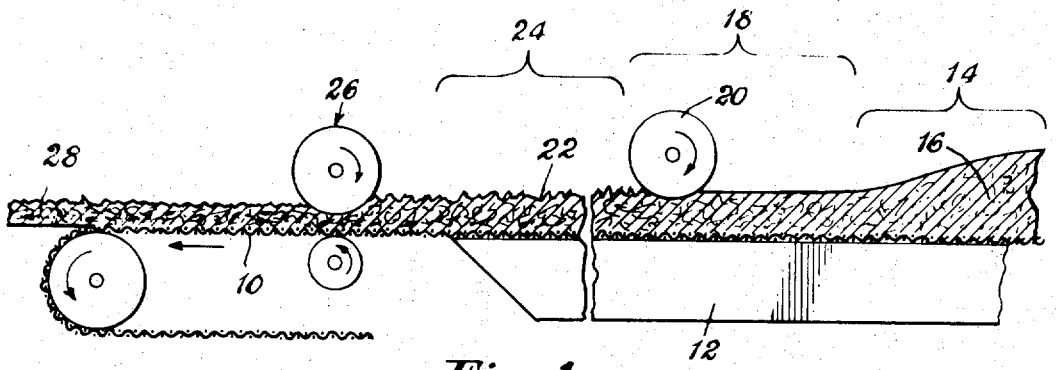

The present invention relates to the production of so-called recessed or fissured panels for ceiling and wall decoration.

One way to form holes and fissures in such panels is to erode them into a finished panel as by sand-blasting through a stencil. Another way is to press fissure-forming dies into a suitable panel, such as a mineral fiber tile. These have the disadvantage that complete randomness is not available when re-using stencils or dies.

Another way is to use a special screeding bar or blade, as described in U.S. No. 2,747,470. As described in said patent, a wet consolidated well felted fibrous mat in a continuous process of production by dewatering a fiber slurry, is cut in slits across the web in a multitude of places to break the felted connection. Then a special screeding bar is pressed onto the web to exert a drag on the slits and open the cut as a fissure.

According to the present invention a fissure-screeding action is applied to a mass which is more mobile than the wet felt described in said patent, and by use of a rotating roll rather than a stationary blade. The mobile mass on which the present invention may be practiced may be a partially dewatered fiber slurry in process to produce a rigid fiber panel, but it is not so limited, as will appear hereinafter, The invention is first described, however, in reference to use in a process involving dewatering a fiber slurry. During dewatering the consistency of the slurry varies progressively from that of the slurry to a thickened fiber suspension or slush in which the fibers are still mobile in response to a moving force, and then to a wet felt in which the wet fibers are felted and relatively fixed in position. At this stage the wet mat is usually compressed to a desired density for drying.

The present invention is based upon the discovery that fissuring or like disturbance of the mobile mass may be effected by a rotating roll, and that the rotation of the roll can be utilized continuously to clean the roll. The angle of the axis of the roll with the direction of the moving web, the character of its surface, and the peripheral velocity of the roll, may be varied to alter the character of the broken surface. In addition, it has been found that such a roll may be used to spread and doctor upon any core-forming body, preferably a felted fiber core, a relatively thick body-forming layer of an aqueous mass having a trowelling consistency, whereby it is doctored to an irregular and broken surface. The aqueous mass may be a smooth paste or may include coarse particulate material presenting different frictional relation to the screeding roll than its matrix. Such material may be particles of material or exfoliated vermiculite.

Thus, the present invention may be used to roll-[screen] *screed* a mass being so dewatered from an initial fiber slurry, as well as to roll-screed a mobile a layer on a surface of an already completed core or a board-form felted fiber felt, either wet or dry.

Accordingly, it is the general object of the present invention to employ a rotating roll with its axis at an angle to the direction of the moving material and to rotate the roll at a controlled peripheral velocity with a directional component in the same direction as the moving material.

It is another object of the invention to vary the character of the roll-screeded surface by varying the peripheral speed of the roll, as well as by varying the surface character of the roll, and in addition, by varying the composition of the mobile aqueous mass.

It is also a particular object of the invention to rotate the screeding roll at a peripheral velocity slightly less than the velocity of the moving material in a manner to exert a drag on the passing material.

It is a further object of the invention to employ the screeding roll as a doctor for leveling onto a body-forming core, such as a felted fiber core, an aqueous mass having a suitable consistency, and in amount to form an appreciably thick body layer in the resulting dried product.

In carrying out the invention the mobile material to be roll-screeded is a viscous plastic mass having what is best described as a trowelling consistency, meaning that it is not a flowing fluid mass which can self-level after roll-screeding, and meaning that it may be placed and displaced to maintain a non-level surface for an appreciable period of time. For example, a magnesium oxychloride cement mix when initially formed is very fluid and in passing under the screeding roll of the present invention, it may be disturbed but quickly levels itself. As it stands and sets it thickens and may become set and rigid in about 30 minutes. Prior to such set it passes through a period of trowelling consistency, but that period in which it may be roll-screeded to leave an irregular surface is so short that a continuous commercial procedure to roll-screed it is impracticable. However, there are mixtures which are slower to set, such as a Portland cement mix, or a gypsum cement mix, with or without set-slowing agents.

The preferred material for roll-screeding is a plastic mass containing particulate material, such as the slush stage of a fiber slurry being dewatered, or an aqueous mass to be dried, which has a trowelling consistency, such as a paste containing fibers or flakes, or granules. Fibers may be vegetable fiber, mineral fibers, either natural or synthetic, or a mixture of these, present in a thickened fluid which fluid can be dried to serve as binder for the fibers, such as a boiled starch paste, or animal glue, or other proteinaceous binder materials.

The roll-screeding action is due to adherence to the roll and slippage from the roll, such as to create a differential in the forward speeds of the top layer and the carrying layer below, all in randomness. Even a polished metal roll is effective to cause a screedable mass to adhere to it and to fall away, leaving an irregular surface. A roughened cylindrical roll enhances the effect. Even when the roll has a peripheral speed the same as the moving material and component in the same direction, the sticking and slipping are effected. The character of the roll-screeded surface may be varied by rotating the roll faster than the body of the material is moving, thus pushing material ahead of the roll in ridges. When the roll is rotated slower than the moving material adherence to the roll drags the material on the conveyed layer below, then lets it go, forming ridges not so high as when the roll moves faster than the material. The results of these actions are more pleasing to the eye in the final product when the roll moves slower than conveyor.

While it is preferred for mechanical reasons to have the axis of the screeding roll at right angles to the moving material, this is not necessary. The roll functions in those angular positions in which it can move forward or backward some of the surface material to leave an irregular surface.

The invention may be practiced as set forth in the accompanying examples, using apparatus such as illustrated in the accompanying drawings, in which:

FIG. 1 diagrammatically represents a portion of a Fourdrinier screen on which a slurry of fibers is being dewatered, showing a screeding roll at a slush stage of the pulp.

Figure 2:
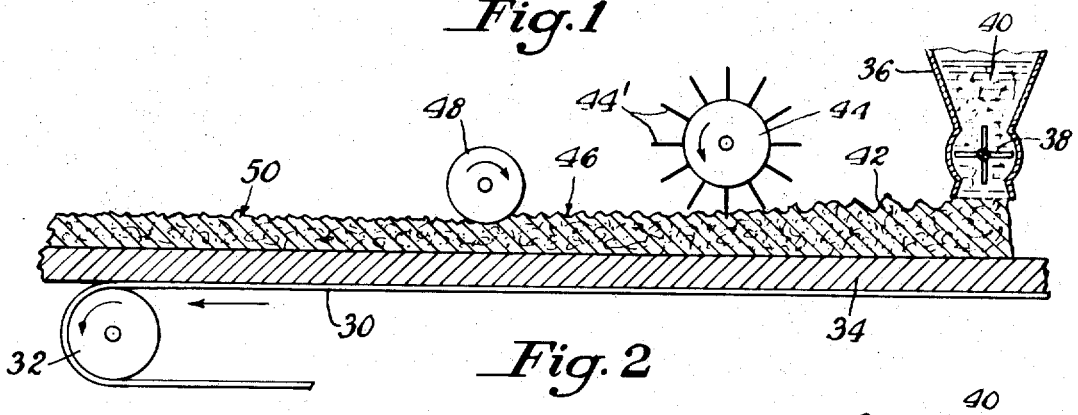
Figure 3:
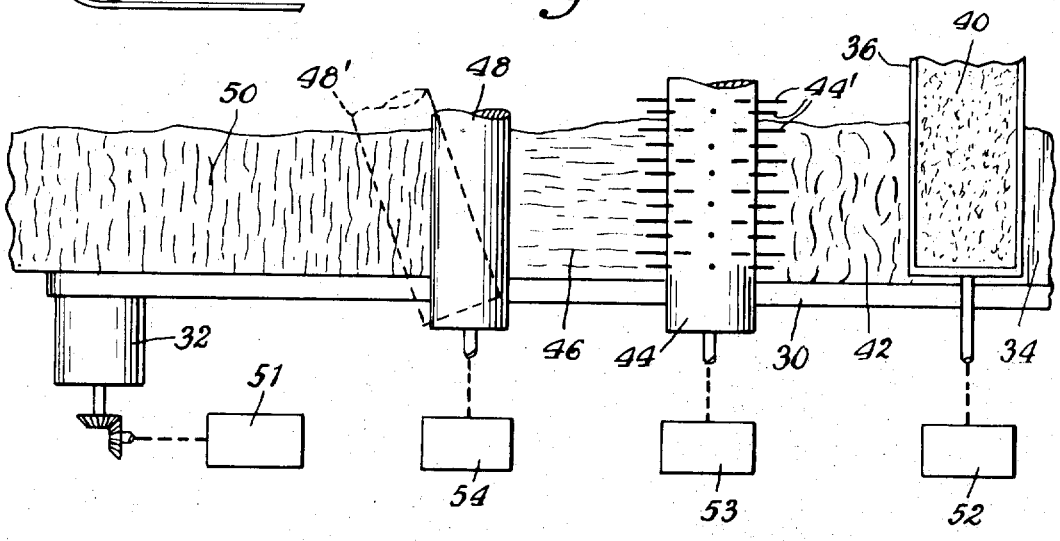

FIG. 2 represents a feeder discharging a plastic screedable mass onto a moving foundation, a spreader for the mass, and a screeding roll doctoring the spread mass to a generally uniform but screeded layer on the foundation which is a core or a core-forming body carried by a conveyer FIG. 3 is a fragmentary diagrammatic plan view of the apparatus of FIG. 2, showing several speed controls for the conveyor, for the screeding roll, for a spike-roll, for a feeding gate, and showing a different position for the screeding roll.

Figure 4:
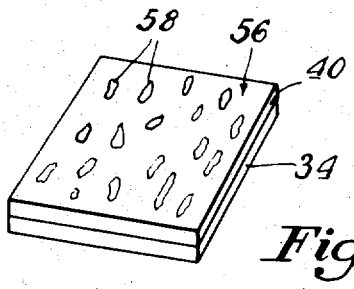

FIG. 4 represents a two-layered tile made by the present invention.

In FIG. 1, a conventional Fourdrinier screen 10 is shown with a suction box 12 beneath it. At the region 14 the carrier material 16 from an original fiber slurry is still in a fluid state losing water into the suction box. At the region 18 the material 16 is thick and plastic in a slush state, in which fiber masses are mobile at a trowelling consistency, the fibers not yet being inter-felted. At this stage a metal roll 20, preferably polished, is positioned to dip slightly into the slush. The axis of the roll is shown at right angles to the direction of conveyor advance. The roll 20 may be small, such as 3 inches in diameter, or large, such as 12 inches in diameter without loss of function. It is rotated at a peripheral velocity in the direction of the moving conveyor the same as, or slightly less, or slightly more than, the velocity of the advancing conveyer.

The roll 20 forms sustained ridges and depressions in the surface 22. As the slush is further dewatered in the region 24 over the suction box, the irregular surface becomes more solid and less plastic as it approaches a pair of squeeze rolls 26. These close some of the recesses and in general lessen the irregularity of the surface without discharging a uniformly thick felt 28 devoid of spaces in or within the surface. The felt is then dried, and when the surface is subsequently sanded to a plane face, the said spaces open in the plane face with the appearance of fissures and holes.

The material 16 for the slurry may be a conventional board-forming slurry of wood fibers, mineral fibers or a mixture of the two, and containing binder material, such as starch, either pasted or as grains, to be processed in a conventional manner.

However, the screeding roll may also be used for an aqueous plastic mass carried on a moving sheet, such as a gypsum panel or a felted fiber sheet, which forms or provides a core portion of a panel having a screeded surfacing body portion. The latter sheet may be a wet board-forming mat, such as one made on the apparatus of FIG. 1, without the screeding roll 20. It may also be an already felted and dried fiber panel to provide a core for receiving a plastic mass to provide a roll-screeded body layer.

FIG. 2 represents a conveyor 30 with a drive roll 32, moving the conveyor to the left and carrying a core-forming body 34 under a feeding hopper 36 having a feeding gate 38 for dumping onto the body 34 from a supply 40 a rough layer 42 of a plastic mass having a trowelling consistency to form the decorative body layer. The rough layer 42 passes under a spike-roll 44 rotating against the moving material to spread the material more evenly but to a generally uniform thick rough layer as indicated at 46. A suitable spike-roll 44 is a cylinder 7 inches in diameter, with radial spikes 44' 1.5 inches long, arranged for example in staggered relation along elements of the cylinder at 2-inch spacings, the elements being approximately 1 inch apart on the circumference of the cylinder.

The rough layer shown at 46 then passes under screeding roll 48 and in contact with it, which roll 48 rotates with the material, but preferably slower. The roll 48 smooths the roughness of the region 46 and by its drag opens fissures into a resulting surface 50. The rate of feed of material supplied by the hopper is controlled to fill the clearance space between the roll 48 and the core-body 34. Excess material can pile ahead of the screeding roll and as it tends to accumulate, the rate of feeding at the hopper 36 is decreased.

The core-forming body 34 may be any completed core, such as a gypsum board, a wood fiberboard, or a mineral fiberboard, and it may also be a wet board-forming felted fiber mat to be dried to form a completed core, such as the mat 28 of FIG. 1, preferably formed without the screeding roll 20. The layered product leaving roll 48 is then dried to produce a two-layer panel with a rough surface. The panel when dried may be coated or not and so used, or it may be sanded to a planar face to present surface recesses of fissures and holes, and then coated or not for use, as desired.

FIG. 3 shows in dotted lines a different position 48' for the roll 48, the roll being arranged for speed control relative to the conveyer drive roll 32. Speed-control driving means 51, 52, 53 and 54 are arranged to rotate, respectively, the drive roll 32, the gate 38, the spike-roll 44 and the roll 48, the latter at suitable peripheral speed relative to the speed of the conveyor 30, as indicated by the dotted lines from the controlled element to the control means.

FIG. 4 represents a square-edged tile cut from a panel made as in FIG. 2 and sanded, showing a felted fiber core layer 34, the applied material 40 as a body layer, a sanded face 56, and recesses 58 as holes or fissures resulting from sanding the irregular surface 50 of FIGS. 2 and 3.

Suitable plastic compositions for the invention are as follows:

COMPOSITION NO. 1

| | By Weight | |
|---|---|---|
| | Parts | Percent |
| Mineral fiber* | 96 | 23 |
| Water | 269 | 67 |
| Starch (gelled in the water) | 9 | 2.2 |
| Gypsum | 31 | 7.4 |
| Wax emulsion (15% wax) | 2 | 0.03 |

*Nodulated or short lengths.

COMPOSITION NO. 2

| | Parts by weight |
|---|---|
| Mineral fiber | 500 |
| Wood fiber [1] | 250 |
| Water | 3000 |
| Starch (gelled in water) | 50 |
| Gypsum | 100 |

[1] Board-forming fiber or sawdust.

COMPOSITION NO. 3

| | Parts by weight |
|---|---|
| Wood sawdust | 1000 |
| Feltable wood fibers | 1000 |
| Water | 2000 |
| Pearl starch (gelled in the water) | 120 |

The speeds used may be varied widely, depending upon the apparatus employed and the material used therewith. As an example, when a mat such as the wet mat 28 of FIG. 1 is carried on a conveyor such as 10 in FIG. 1, moving at forty feet per minute, the roll 20 running with it at a peripheral speed of thirty-eight feet per minute produces a relatively finer texture, and when running at 33 feet per minute, produces a relatively coarser texture.

It is to be understood that the invention is not limited to or by the illustrative disclosure above and that different cores and different compositions may be used within the scope of the invention as set forth in the appended claims.

I claim:

[1. The method which comprises moving a carrier sheet substrate on a conveyor in a linear direction close to and under a roll rotatable on an axis at an angle to said direction and forming a clearance space between said roll and said substrate, supplying a viscous aqueous plastic mass having a trowelling consistency on said sheet ahead of said roll to a height at least to close said clearance space, doctoring onto said substrate the material from said mass which is carried to and through said clearance space by said substrate to form on said substrate a top layer and simultaneously forming an irregular surface on said top layer with elevations and depressions therein by rotating said roll at a peripheral velocity which is in the range of from slightly slower to slightly faster than the velocity of the substrate, and abrading the surface of said top layer to a plane at a level above the bottoms of depressions therein.]

*2. The method which comprises moving a carrier sheet substrate selected from the group consisting of (1) a wet board-forming mat or (2) a dry board-like panel on a conveyor in a linear direction close to and under a roll rotatable on an axis at an angle to said direction and forming a clearance space between said roll and said substrate, supplying a viscous aqueous plastic mass having a trowelling consistency on said sheet ahead of said roll to a height at least to close said clearance space, doctoring onto said substrate the material from said mass which is carried to and through said clearance space by said substrate to form on said substrate a top layer and simultaneously forming an irregular surface on said top layer with elevations and depressions therein by rotating said roll at a peripheral velocity which is in the range of from slightly slower slightly faster than the velocity of the substrate, and abrading the surface of said top layer to a plane at a level above the bottoms of depressions therein.*

*3. The method which comprises moving a carrier sheet substrate selected from the group consisting of (1) a wet board-forming mat or (2) a dry board-like panel on a conveyor in a linear direction close to and under a roll rotatable on an axis at an angle to said direction and forming a clearance space between said roll and said substrate, supplying a viscous aqueous plastic mass having a trowelling consistency on said sheet ahead of said roll to a height at least to close said clearance space, doctoring onto said substrate the material from said mass which is carried to and through said clearance space by said substrate to form on said substrate a top layer and simultaneously forming an irregular surface on said top layer with elevations and depressions therein by rotating said roll at a peripheral velocity which is in the range of from slightly slower to slightly faster than the velocity of the substrate.*

References Cited

The following references, cited by the Examiner, are of record in the patented file of this patent or the original patent.

UNITED STATES PATENTS

| | | | |
|---|---|---|---|
| 1,766,096 | 6/1930 | Benedict | 162—108 |
| 1,921,504 | 8/1933 | Chase et al. | 162—108 |
| 2,717,538 | 9/1955 | Alexander | 162—116 |

ALFRED L. LEAVITT, Primary Examiner

T. E. BOKAN, Assistant Examiner

U.S. Cl. X.R.

117—126, 140, 164, 165; 162—109; 264—86, 139, 162, 257